United States Patent [19]

Koshiishi

[11] Patent Number: 5,041,917
[45] Date of Patent: Aug. 20, 1991

[54] FACSIMILE APPARATUS ADAPTED TO COMMUNICATE VIA MORE THAN ONE TRANSMISSION MEDIUM EACH HAVING DIFFERENT TRANSMISSION QUALITY

[75] Inventor: Takaho Koshiishi, Tokyo, Japan

[73] Assignee: Ricoh Company, Ltd., Tokyo, Japan

[21] Appl. No.: 482,839

[22] Filed: Feb. 21, 1990

[30] Foreign Application Priority Data

Jul. 3, 1989 [JP] Japan .................. 1-169953

[51] Int. Cl.⁵ .............................................. H04G 1/32
[52] U.S. Cl. ................................... 358/434; 358/435; 358/436; 358/445; 379/33
[58] Field of Search ............... 358/405, 434, 435, 436, 358/437, 438, 439, 443, 445; 379/32, 33

[56] References Cited

U.S. PATENT DOCUMENTS 4,887,162  12/1989  Arai ..................................... 358/434
4,933,770  6/1990   DeSpain ............................. 358/434
4,975,783  12/1990  Takaoka ............................. 358/437

FOREIGN PATENT DOCUMENTS 59-41971  3/1984  Japan .

Primary Examiner—Leo H. Boudreau
Assistant Examiner—Steven P. Fallon
Attorney, Agent, or Firm—Oblon, Spivak, McClelland, Maier & Neustadt

[57] ABSTRACT

A facsimile apparatus comprises a modem, a communication controller, an image reader, an image recorder, and a system controller, wherein the system controller comprises a first medium discriminating part for discriminating the type of the transmission medium used, an error detection part for detecting a transmission error upon reception of the received image data on the basis of a predetermined error detection standard, an error detection reference part for setting the predetermined error detection standard in accordance with type of the transmission medium discriminated by the first medium discriminating means, error reporting means for controlling the communication controller such that an error signal indicative of a transmission error is transmitted to another facsimile apparatus, and a second medium discriminating part for controlling the communication control means such that the type of the first transmission medium is reported to said another facsimile apparatus.

15 Claims, 10 Drawing Sheets

FACSIMILE APPARATUS ADAPTED TO COMMUNICATE VIA MORE THAN ONE TRANSMISSION MEDIUM EACH HAVING DIFFERENT TRANSMISSION QUALITY

BACKGROUND OF THE INVENTION

The present invention generally relates to facsimile apparatus and more particularly to a facsimile apparatus adapted to communicate via more than one transmission medium each having different transmission quality.

In the commonly used facsimile communication system designed according to the CCITT G3 standard, a facsimile apparatus in the source terminal transmits a PIX signal representing a coded image data for one page document, and when this is completed, sends an EOP signal indicative of end of transmission of that page. In the destination terminal, a facsimile apparatus receives the PIX signal sequentially, and decodes the transmitted image from the PIX signal thus received In this process of decoding, occurrence of transmission error is monitored in each line.

In the conventional facsimile communication procedure, the facsimile apparatus at the destination terminal returns a signal commonly designated as an RTN signal to the source terminal when the detected transmission error has exceeded a predetermined threshold. The discrimination is made usually when the number of transmitted lines that involved the transmission error has reached a predetermined number such as ten. In response to this RTN signal, the facsimile apparatus in the source terminal terminates the transmission by sending a DCN signal indicative of disconnection of facsimile transmission. At the same time, the facsimile apparatus in the source terminal displays a message such as "RE-SEND THE DOCUMENT" and requests the re-transmission of document to the operator at the source terminal.

In recent years, facsimile communication is made not only between facsimile apparatuses at offices via wired transmission line in which a high transmission quality is guaranteed but also between a facsimile apparatus at a fixed station such as in an office and a facsimile apparatus at a mobile station such as on an automobile, or between two mobile stations via a wireless or radio transmission line. The term "wired transmission line" used herein means a transmission line such as public telephone network wherein a high transmission quality is guaranteed and may involve radio transmission path wherein a high transmission quality is guaranteed such as microwave transmission path or satellite transmission path therein. On the other hand, the phrase "wireless transmission line" means a transmission line such as automobile telephone network which provides a communication service with a lesser transmission quality. Further, there is recently developed a portable facsimile apparatus which can be connected to the public telephone network via an acoustic coupler. When using this portable facsimile apparatus, the acoustic coupler connected to the facsimile apparatus is mounted on a handset of telephone apparatus and the facsimile transmission is made in a form of acoustic signal exchanged between the acoustic coupler and the telephone handset.

In such a newly developed facsimile communication system using the transmission medium such as wireless transmission line or acoustic coupler, the system is naturally vulnerable to noises and thus, there occurs rather easily a case in which transmission error amounting several tens of lines appears in one page document. When this occurs, the conventional facsimile apparatus interrupts the facsimile transmission and requests the operator to re-send the document. Thus, there arises a problem that the operator has to carry out a number of trials in order to send one document when the facsimile transmission is made via wireless transmission line or via acoustic coupler.

This problem may be solved if the error detection at the destination side facsimile apparatus is totally omitted and the destination receives the facsimile transmission whatever the quality of the transmission may be. However, such a measure is unacceptable as there is a substantial chance that an entirely unintelligible document is transmitted without the operator at the source terminal knowing the fact that the transmission is failure and the transmitted image is unintelligible.

Thus, the conventional facsimile transmission system adapted for performing facsimile transmission via more than one transmission medium suffers from a problem that the facsimile transmission has to be repeated a number of times in order to complete transmission of even one page of the document. Otherwise, one has to accept poor quality of transmission in which a substantial part of the document may be dropped or unintelligible.

SUMMARY OF THE INVENTION

Accordingly, it is a general object of the present invention to provide a novel and useful facsimile apparatus wherein the aforementioned problems are eliminated.

Another and more specific object of the present invention is to provide a facsimile apparatus adapted for facsimile communication via more than one transmission medium each having different transmission quality, wherein the number of trials to send a document in order to achieve a satisfactory quality of transmission of the document is reduced, and wherein the threshold to distinguish whether the facsimile transmission has a satisfactory quality or not is changed in accordance with the type of the transmission medium used. According to the present invention, a facsimile transmission of reduced quality is accepted when the facsimile transmission is made via a transmission medium having a poor transmission quality although still maintaining a predetermined minimum quality of facsimile transmission. Thereby, repetitive trial of transmitting a document, otherwise would have to be made until a satisfactory transmission is obtained, is avoided while at the same time maintaining a certain quality of facsimile transmission. Only when it is discriminated that the quality of transmission is poor with respect to the reduced threshold quality or standard, a request is made to the operator at the source terminal to re-send the document.

In one embodiment, discrimination of the transmission quality is made by the number of error lines in one page document in which the transmission error has occured. Thus, the foregoing threshold corresponds to the allowable number of error lines involving the transmission error, and this allowable number of error lines is changed in accordance with the type of the transmission medium. Thus, the allowable number of error lines involving the transmission error is increased when the transmission medium having a poor transmission quality is used while the allowable number of such lines is decreased when the transmission medium used has a high transmission quality. The discrimination of the transmission quality whether the transmission is acceptable or not may be made further on the basis of continuous appearance of lines involving the transmission error. In this case, the number of allowed error lines is kept small, as the continuous dropout of lines makes the document easily unintelligible even when the number of lines involving the error is small.

Other objects and further features of the present invention will become apparent from the following detailed description when read in conjunction with attached drawings.

DETAILED DESCRIPTION

Figure 1:
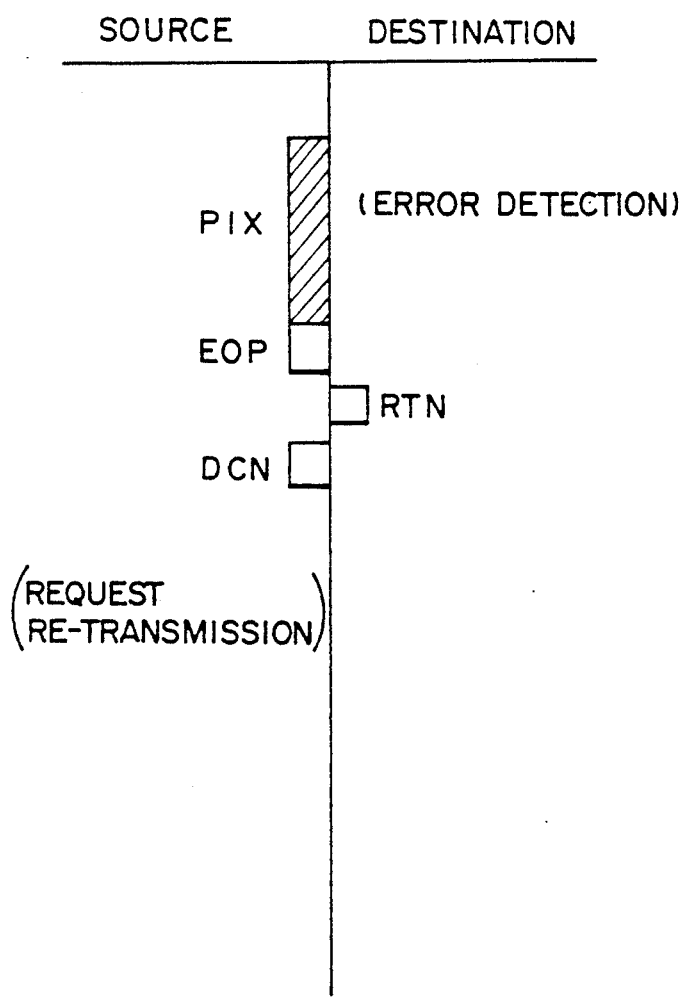
FIG. 1 is a diagram showing a communication procedure commonly used in the prior art facsimile system.
Figure 2:
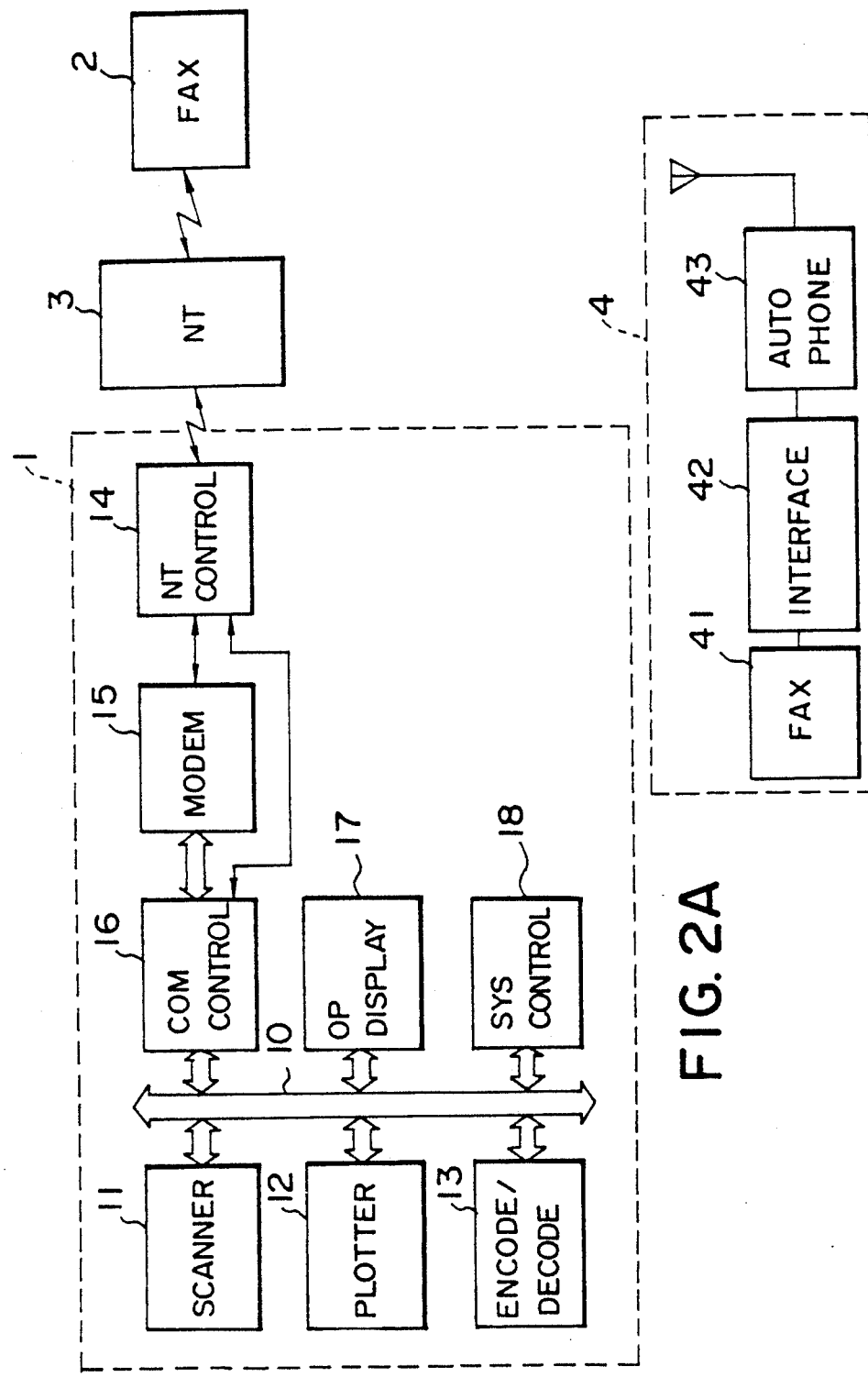
FIG. 2A is a block diagram showing a construction of a facsimile system according to a first embodiment of the present invention.
FIG. 2B is a block diagram showing a facsimile apparatus loaded on an automobile and the like and constituting a part of the system of FIG. 2A.

FIG. 2A shows a facsimile system in which a facsimile apparatus according to a first embodiment of the present invention is used.

Referring to FIG. 2A, the facsimile system is used in a fixed station such as office and comprises a fixed type facsimile apparatus 1 which in turn comprises a scanner 11, a plotter 12, an encoding and decoding unit 13, a communication controller 16, an operation/display unit 17, and a system controller 18 coupled to each other via a system bus 10. Further, a modem 15 is coupled to the communication controller 16.

The scanner 11 reads a document image and outputs an image data with a predetermined resolution in response to the reading of the document. The image data thus obtained is supplied to the plotter 12 where the image data is recorded onto a recording sheet in a form of a visual image. The encoding and decoding unit 13 encodes the image data which is to be transmitted to a facsimile apparatus at a destination terminal when the facsimile apparatus 1 is used as a source terminal sending a facsimile transmission. When the facsimile apparatus 1 is used for receiving a facsimile transmission, the encoding and decoding unit 13 performs a decoding of transmitted image data.

The modem 15 modulates a carrier by the image data to be transmitted to form a modulated carrier when transmitting an image data and demodulates the modulated carrier when receiving the image data to recover the transmitted image data. Further, the modem 15 transmits various procedure signals of transmission control procedure. The modem 15 is connected to a network controller 14 which is physically connected to a public telephone network 3 and the network controller 14 performs a predetermined automatic calling and answering procedure. Thereby, a connection is established between the facsimile apparatus 1 and another facsimile apparatus 2 at the other end of the network 3.

The network 3 may be a wired telephone network commonly used for public telephone communication or may be a network involving a wireless transmission path as in the case of public automobile telephone network. In the former case, the facsimile apparatus 2 at the other end of the network 3 is used in another fixed station and may have a construction similar to that of the facsimile apparatus 1 while in the latter case, the facsimile apparatus is used in a mobile station provided in an automobile and may have a construction shown in FIG. 2B.

FIG. 2B shows a mobile facsimile system 4 comprising a facsimile apparatus 41, wherein the facsimile apparatus 41 has a construction similar to that of the apparatus 1 except that the network controller 14 is not used as will be described layer with reference to FIG. 6. Thus, the facsimile apparatus 41 is connected to an automobile telephone apparatus 43 via an interface unit 42 provided for signal level adjustment or impedance matching between the modem 15 and the automobile telephone apparatus 43.

The communication controller 16 controls the communication in the error correction mode (ECM) of the group III standard recommended by the CCITT, and makes a predetermined facsimile communication. The operation/display unit 17 has an operation portion for setting various operations of the facsimile apparatus 1 (or facsimile apparatus 41) and a display portion for displaying modes of the facsimile apparatus 1 (or 41), guidance for operating the facsimile apparatus 1 (or 41) and the like.

The system controller 18 comprises a microcomputer for example, and controls the scanner 11, the plotter 12, the encoding and decoding unit 13, the communication controller 16 as well as the operation/display unit 17 so as to carry out a predetermined operation of the facsimile apparatus 1 (or 41).

Figure 3:
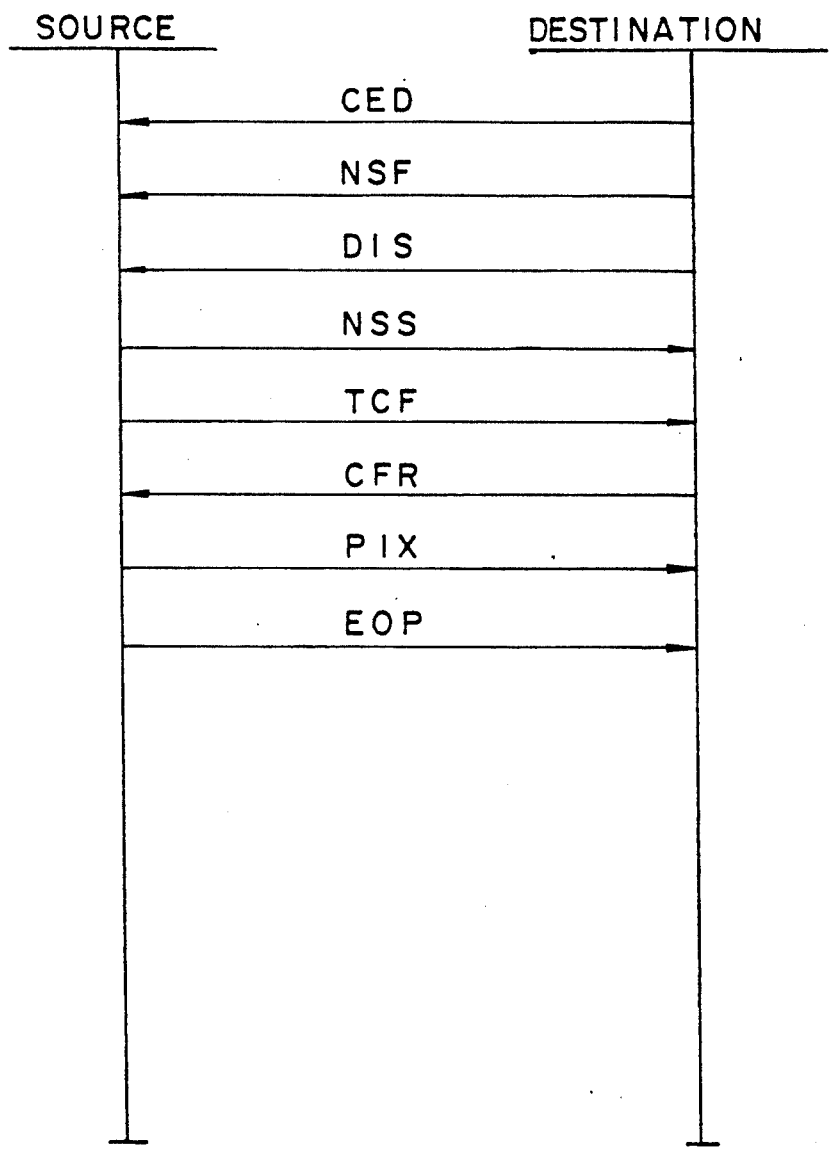
FIG. 3 is a diagram showing procedure signals transmitted at a start of facsimile communication.

FIG. 3 shows a sequence of procedure signals exchanged at the beginning of the image transmission, after the connection between a source terminal and a destination terminal is established.

Referring to FIG. 3, a facsimile apparatus at the destination terminal sends sequentially a called station identification (CED) signal, a non-standard facilities (NSF) signal and a digital identification signal (DIS) all specified in the CCITT recommendation, wherein the CED signal informs the source that the facsimile apparatus at the destination terminal is ready to receive the transmission while the NSF signal and the DIS signal inform the functions of the facsimile apparatus at the destination terminal to the source terminal. The CED, NSF and DIS signals are produced by the communication controller 16. In response to the NSF and DIS signals, the facsimile apparatus at the source terminal sends a non-standard facilities set-up signal (NSS) to the facsimile apparatus at the destination terminal informing of the condition that the facsimile transmission will be made.

Figure 4:
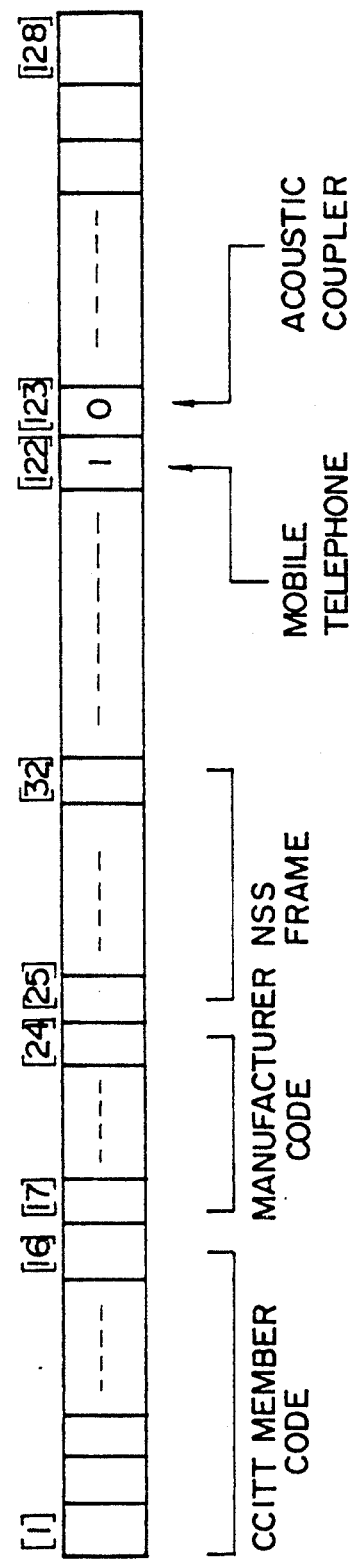
FIG. 4 is a diagram showing a structure of an NSS signal used in the facsimile system of FIG. 2A for discriminating the type of transmission medium used for facsimile communication.

FIG. 4 shows the structure of the NSS signal. In the present embodiment, the NSS signal comprises a 128 bit digital data, wherein the first 16 bits or 2 bytes are used for statement that this signal has a structure in compliance with the CCITT protocol, and a manufacturer's code is represented in the column from a bit 17 to a bit 24 in a form of eight bit or one byte data. Further, in the column from a bit 25 to a bit 32, a statement that the signal is the NSS signal is made in a form of eight bit or one byte data.

After a bit 33, various of facsimile transmission conditions are specified up to the last bit at a bit 128, wherein the type of the transmission medium used for facsimile transmission is specified in a form of two-bit data in bits 122 and 123. When the facsimile transmission is to be made by the usual wired telephone network from the facsimile apparatus 1 at a fixed station such as office, both of the bits 122 and 123 are set to zero. When the facsimile transmission is to be made from the facsimile apparatus 4 at a mobile station such as automobile, a digit "1" is set in the bit 122. Further, when the facsimile transmission is to be made from a facsimile apparatus coupled to the public telephone network via an acoustic coupler as will be described later with reference to a second embodiment of the present invention, a digit "1" is set in the bit 123.

The foregoing NSS signal is produced by the communication controller 16 of the facsimile apparatus at the source terminal under control of the system controller 18. Thus, the communication controller 16 of the facsimile apparatus 1 in the fixed station sets the digit "0" in the bits 122 and 123 when sending a facsimile transmission, while the communication controller 16 of the facsimile apparatus 41 in the mobile station sets the digit "1" in the bit 122 when sending a facsimile transmission. As long as the facsimile apparatus 1 is the fixed type machine and used always in combination with the fixed station in the office or as long as the facsimile apparatus 41 is used always in combination with the automobile telephone, the foregoing setting of the digit in the bit 122 in the NSS signal is unconditional.

Figure 5:
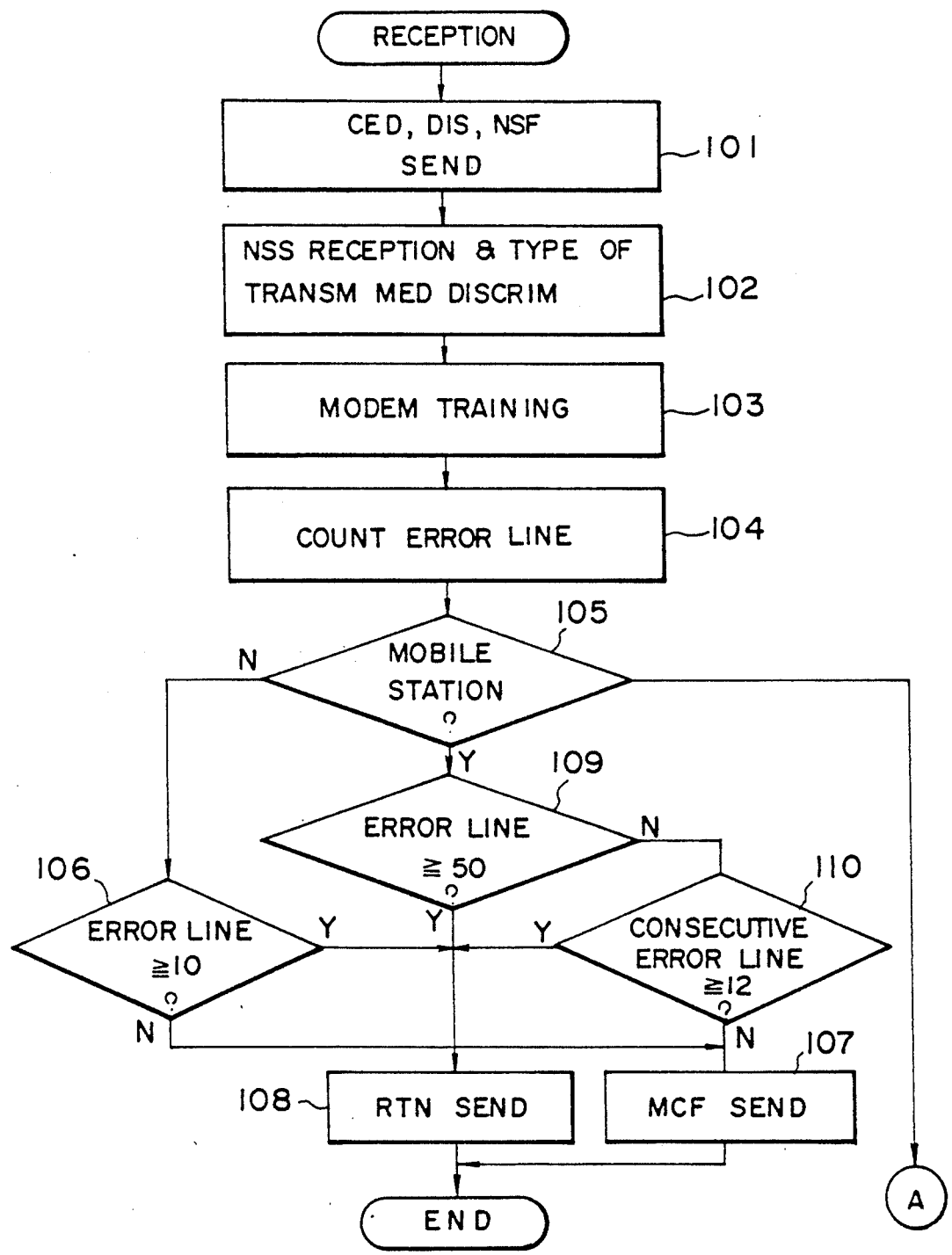
FIG. 5 is a flowchart showing an error detection process performed in a facsimile apparatus in FIG. 2A in the reception mode.

Next, the operation of the facsimile apparatus at the destination terminal will be described with reference to FIG. 5 showing an operation of the stationary type facsimile apparatus 1 under control of the system controller 18 when receiving a facsimile transmission. In this case, there are two possibilities that the facsimile transmission is made from another stationary type facsimile apparatus operating at a fixed station or the facsimile transmission is made from a facsimile apparatus operating in a mobile station such as automobile telephone. The case that the facsimile apparatus 1 receives facsimile transmission from a facsimile apparatus using the acoustic coupler will be considered later. As already described with reference to the prior art, the quality of facsimile transmission from the mobile station is significantly inferior to that from the fixed station and it is desirable to change the threshold discriminating whether the facsimile transmission is acceptable or not in accordance to the type of the transmission medium used.

In a step 101 following the establishment of connection between the source terminal and the destination terminal, the facsimile apparatus 1 sends the CED, DIS and NSF signals to the source terminal and receives the NSS signal in a step 102. As already described, this NSS signal carries in its bit 122 the data indicating that the facsimile transmission is made from a fixed station via a wired transmission line or from a mobile station via a wireless transmission line, and the system control part 18 discriminates whether the facsimile transmission is made via the wired transmission line or not on the basis of the state of the bit 122 of the received NSS signal.

Next, in a step 103, the facsimile apparatus 1 receives a modem training signal TCF from the source terminal and performs a predetermined modem training of the basis of the TCF signal in a step 103. When the modem training is completed successfully, a CFR signal indicative of completion of modem training is sent back to the source terminal.

After the step 103, an image information PIX for one page document is received in a step 104 and the received PIX is line sequentially decoded one line by one line while monitoring the transmission error according to the predetermined, known procedure. Such a procedure is well established and the description thereof will be omitted. At the same time, the number of error lines that involved transmission error is counted up while carrying out recording of the received image of the lines which are free from transmission error sequentially on a recording sheet.

In a step 105, a discrimination is made, on the basis of the bit 122 of the received NSS signal whether the facsimile transmission is made from a mobile station via a radio wave transmission line or not. If the result of discrimination is NO indicating that the facsimile transmission is made from a facsimile apparatus at a fixed station via a wired transmission line, an error discrimination is made in a step 106 in which it is decided that the facsimile transmission is unacceptable when the number of error lines involving the error reaches ten or more. This ten-line threshold for discriminating the failure of facsimile transmission is commonly used in the current facsimile apparatus used in the fixed stations such as office.

If the result of discrimination in the step 106 is NO indicating that the quality of facsimile transmission is acceptable, a signal designated as a MCN signal is sent to the source terminal informing the facsimile apparatus at the source terminal of the successful reception of the facsimile transmission. On the other hand, when the result of discrimination in the step 106 is YES indicating that there are ten or more error lines containing transmission error and the quality of facsimile transmission is unacceptable, the RTN signal is sent to the source terminal in a step 108 and the facsimile transmission is terminated. This threshold of ten error lines in the discrimination step of 106 is currently used in the conventional facsimile apparatus as already noted and thus, the foregoing process is identical to the process performed in the currently used fixed type facsimile apparatus for office use.

When it is discriminated in the step 105 that the facsimile transmission is made from a mobile station on an automobile, a discrimination is made subsequently in a step 109 if the number of error lines involving the transmission error has reached or exceeded 50 lines or not. If yes, the RTN signal 108 is sent to the source terminal facsimile on the mobile station in the foregoing step 108 and the transmission is disconnected. In response to this, the facsimile apparatus at the source terminal displays a message such as "RE-SEND THE DOCUMENT" to the operator at the source terminal.

Thus, it will be understood that the threshold number of error lines used for discriminating the failure of facsimile transmission is now increased and a less stringent standard is imposed as to the quality of the facsimile transmission when the facsimile transmission is made from a mobile station.

When the result of discrimination in the step 109 is NO indicating that the number of error lines involving transmission error in one page is less than fifty, it is further discriminated in a step 110 whether there are error lines in continuation for twelve lines or more or not. If yes, the RTN signal is sent in the step 108 and the transmission is disconnected similarly to the case where there are fifty or more error lines involving the transmission error. Only when the number of such error lines involving the transmission error is less than 50 and at the same time there are no continuous appearance of such error lines in succession for twelve lines or more, the facsimile transmission is accepted satisfactory and the MCN signal is sent in the step 107. Thus, even though the standard for discriminating the failure of facsimile transmission is lowered in the case of receiving facsimile transmission from mobile stations, certain standard is still maintained and the minimum quality of facsimile transmission is guaranteed.

By choosing the threshold number of error lines for discriminating the transmission failure for the case of facsimile transmission from mobile stations to be fifty as described, error lines of about 5% are allowed when the document to be transmitted is a standard A4 size document transmitted with a line density of 3.85/mm in an ordinary mode. Note that, in such a case, the document contains about 1140 lines in one page and the foregoing 50 allowable error lines corresponds to about 5% of the total line.

In the usual document, each letter has a size of about 5 mm × 5 mm. When the line density is set to the foregoing 3.85/mm, the letter of this size includes about 13 lines. Thus, by setting the threshold for the case of continuous appearance of the transmission errors to twelve lines as in the step 110, problem such as the acceptance of total dropout of one line of letters in the document without knowing that such a dropout has occured is positively avoided. When such a drop out occurs, there are cases that the operator at the destination terminal cannot notice the error from the received document, as the entire one document line is dropped out. In the facsimile apparatus of the present invention, the request is made to the operator at the source terminal to re-transmit the document when such a case arises.

When receiving the facsimile transmission by a facsimile apparatus at a mobile station, the foregoing step 105 as well as the step 106 are omitted, as the wireless transmission line is used always in such an apparatus.

Figure 6:
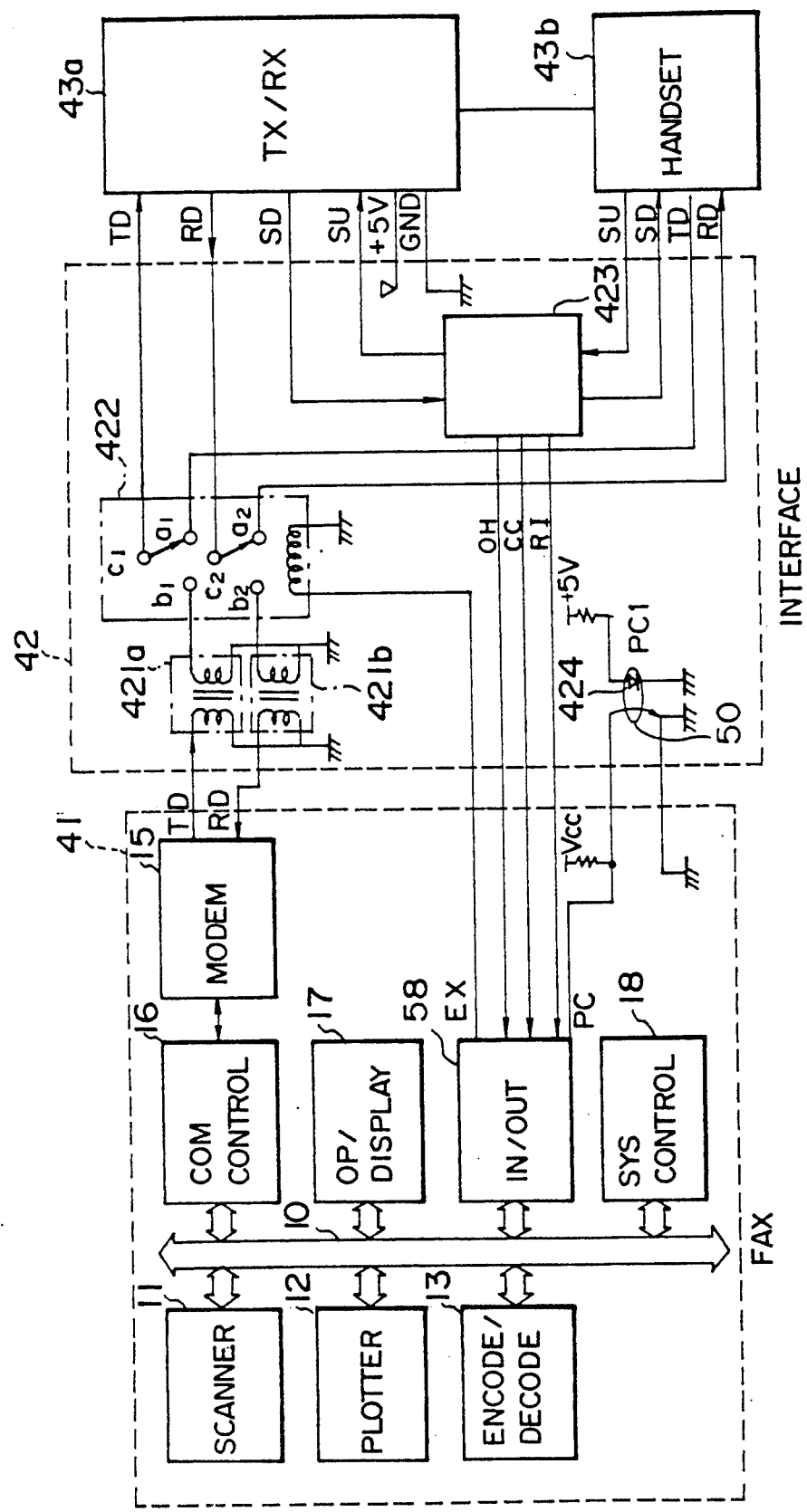
FIG. 6 is a block diagram showing a mechanism used in the facsimile system of FIG. 2B for detecting that a facsimile apparatus is connected to a mobile telephone set.

FIG. 6 shows an example of the facsimile system used in the mobile station. Thus, the system in FIG. 6 corresponds to the facsimile system of FIG. 2B. In the drawing, the parts corresponding to the parts already described with reference to preceding drawings are given identical reference numerals and the description thereof will be omitted.

Referring to FIG. 6, the interface unit 42 includes transformers 421a and 421b for impedance matching, a relay switch 422, and a serial signal transfer/detection unit 423. The automobile telephone apparatus 43 comprises a tranceiver set 43a 10 and a handset 43b. The interface unit 42 is connected to the tranceiver set 43a and to the handset 43b, and the image data to be transmitted is sent to the tranceiver set 43a from the modem 15 via the transformer 421a and the relay switch 422. When receiving the transmitted image data, the image data is sent from the tranceiver set 43a to the modem 15 via the relay switch 422 and the transformer 421b.

The serial signal transfer/detection unit 423 receives a predetermined serial down signal SD from the tranceiver set 43a and transfers the signal SD to the handset 43b. Further, the unit 423 receives a predetermined serial up signal SU from the handset 43b and transfers the signal SU to the tranceiver set 43a. Further, the serial signal transfer/detection unit 423 sends a predetermined on-hook signal OH, call-in signal CC and a ringing signal RI to the facsimile apparatus 41. The foregoing construction and function of the serial signal transfer/detection unit 423 is known and not related to the subject matter of the present invention. Thus, further description with regard to the unit 423 will be omitted.

In the interface unit 42, it should be noted that there is provided a light emitting diode LED 424. When the facsimile apparatus 41 is connected to the interface unit 42, a corresponding photo-sensor 50 provided in a connector assembly of a cable which is connected to the facsimile apparatus for connection to the interface unit 42 is engaged with the LED 424, and there is formed a photocoupler PC1 as shown in FIG. 6. When the facsimile apparatus 41 is connected to the interface 42, the photo-sensor produces an output signal PC which assumes a low level state while when the facsimile apparatus 41 is dismounted from the interface unit 42, the output signal PC of the photo-sensor 50 becomes high. Thus, the photocoupler PC1 discriminates the physical connection of the facsimile apparatus to the interface unit 42.

In response to the low-level output signal PC which is supplied to the system controller 18 via an input/output unit 58 which is connected on the one hand to the photosensor 50 and further to the system bus 10, the system controller 18 controls the communication controller 16 such that the digit "1" is set in the bit 122 of the NSS signal to be sent to the destination terminal. In response thereto, the facsimile apparatus at the destination terminal can know that the facsimile transmission is made from a mobile station via a wireless transmission line.

The facsimile apparatus 41 of FIG. 6 is suitable for a portable facsimile apparatus in that the apparatus can be dismounted from the interface unit 42 and connected to the wired transmission line via a network controller provided separately when the facsimile apparatus 41 is used outside of the automobile. In such an apparatus, it is possible to discriminate whether the facsimile apparatus 41 is connected to the automobile telephone apparatus 43 or to the wired transmission line on the basis of the state of the signal PC. Thus, it becomes possible to control the digit in the bit 122 of the NSS signal depending on the state of the PC signal.

Figure 7:
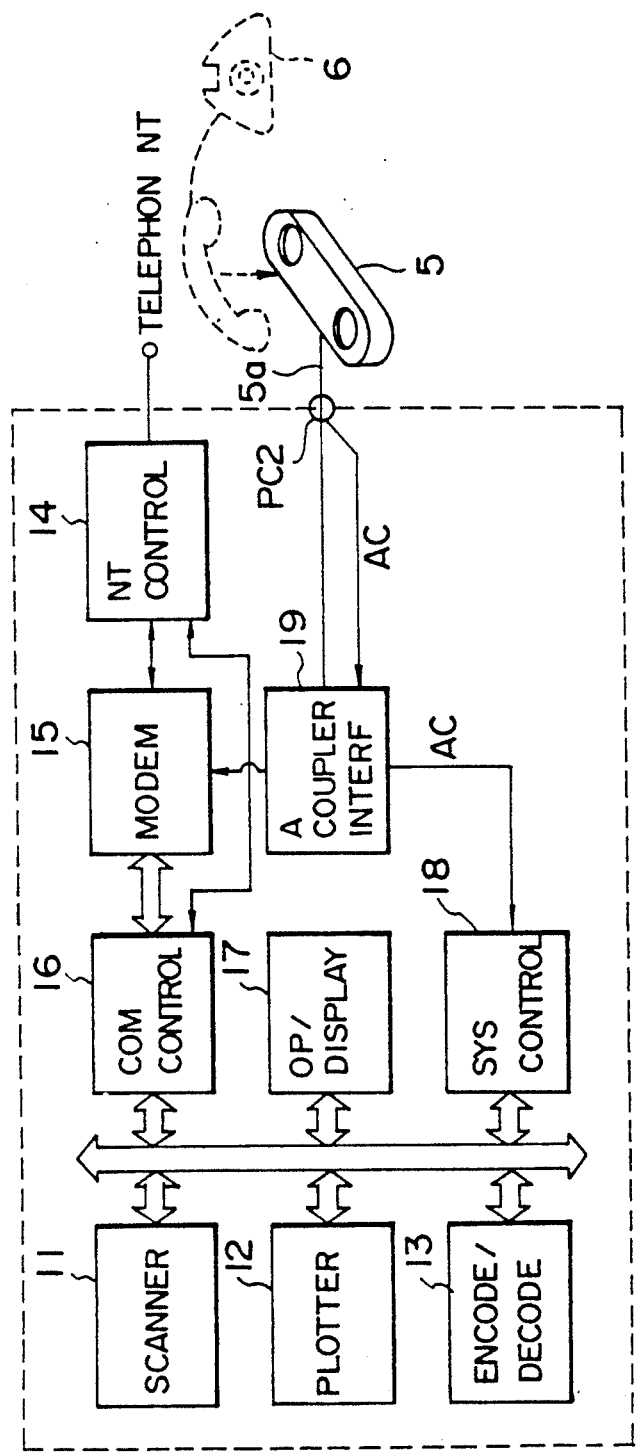
FIG. 7 is a block diagram showing a construction of a facsimile system in which facsimile transmission is made via an acoustic coupler.

Next, a second embodiment of the present invention will be described with reference to FIG. 7 wherein an acoustic coupler is used for connecting the facsimile apparatus 1 to the wired transmission line. In FIG. 7, the parts described already with reference to preceding drawings are given identical reference numerals and the description thereof will be omitted.

Referring to FIG. 7, the facsimile apparatus 1' comprises an acoustic coupler interface 19 which is adapted to be connected to an acoustic coupler 5 via a cable 5a. This acoustic coupler 5 is mounted on a handset of a telephone and establishes a communication with the public telephone network by exchanging information signals between the handset in a form of acoustic signal.

The acoustic coupler interface 19 is connected to the modem 15 and sends the signal received by the acoustic coupler 5 to the modem 15 and further sends the output signal of the modem 15 to the acoustic coupler 5. Further, the acoustic coupler interface 19 is connected to the system controller 18 for providing a signal AC indicating that the acoustic coupler is used to the system controller 18. This signal AC may be produced in response to the connection of the cable 5a to the acoustic coupler interface 19. The detection whether the cable 5a is connected to the interface 19 may be made for example by a photocoupler PC2 similar to the photocoupler PC1 described in FIG. 6. Thus, when the cable 5a is connected to the facsimile apparatus 1', a photo-sensor similar to the photo-sensor 50 and coupled to an LED similar to the LED 424 and forming the photocoupler PC2, produces the signal AC having the low level state indicating that the acoustic coupler 5 is used. When the cable 5a is not connected, the signal AC assumes a high-level state. As the construction of the photocoupler PC2 is identical to that of the photocoupler PC1, the illustration and description will be omitted. Alternatively, the signal AC may be given by the acoustic coupler 5 when the power switch of the acoustic coupler 5 is turned on.

In response to the signal AC detecting the use of the acoustic coupler 5, the communication controller 16 sets the digit "1" in the column or bit 123 of the NSS signal, and on the basis of this NSS signal, the facsimile apparatus at the destination terminal discriminates that the facsimile transmission is sent via transmission path involving an acoustic coupler by performing the steps shown in FIG. 5 except that the discrimination step 105 discriminates the use of the acoustic coupler by watching the bit 123 of the NSS signal.

Figure 8A:
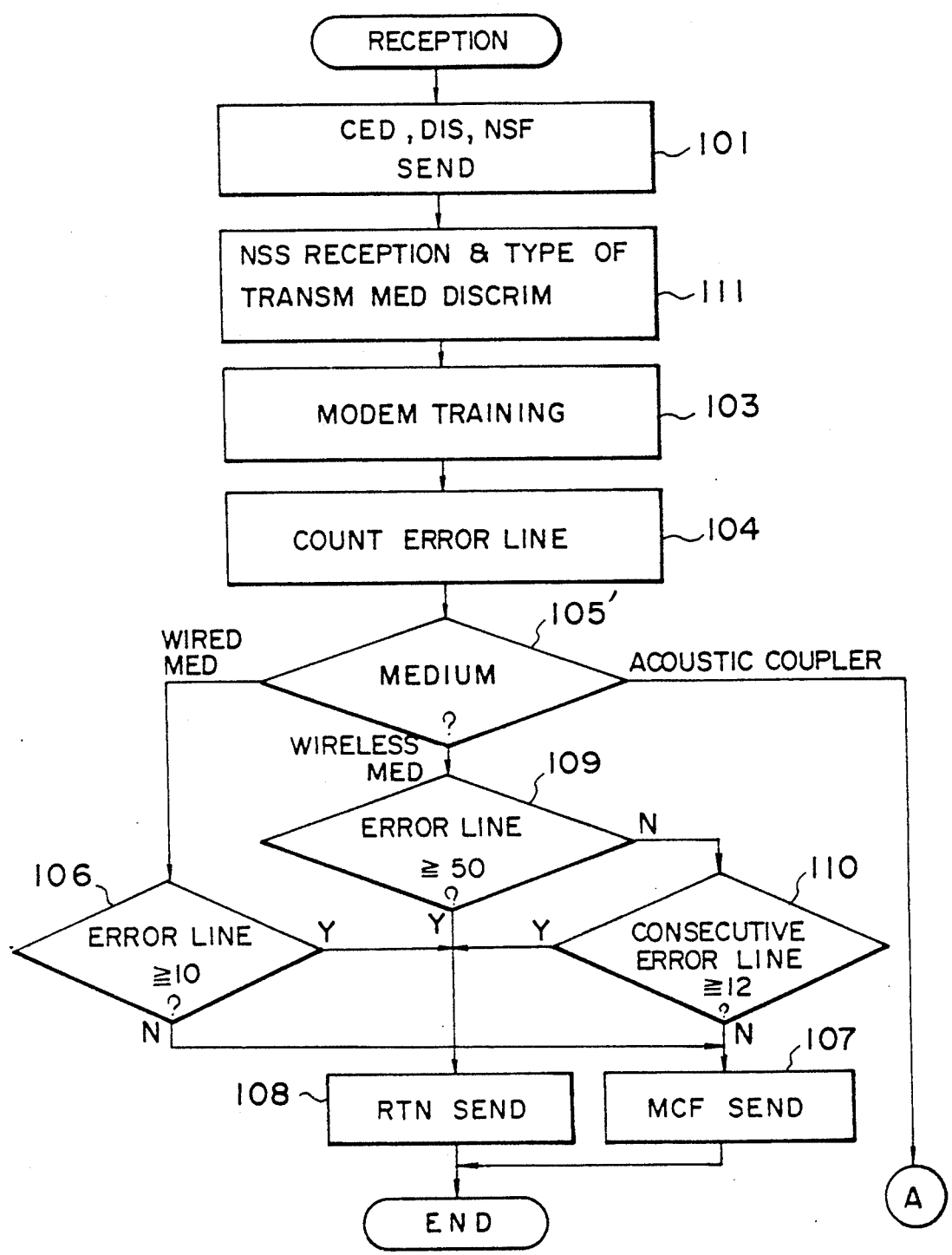
FIGS. 8A and 8B are flowcharts showing another error detection process performed in the facsimile system of FIG. 2A.
Figure 8B:
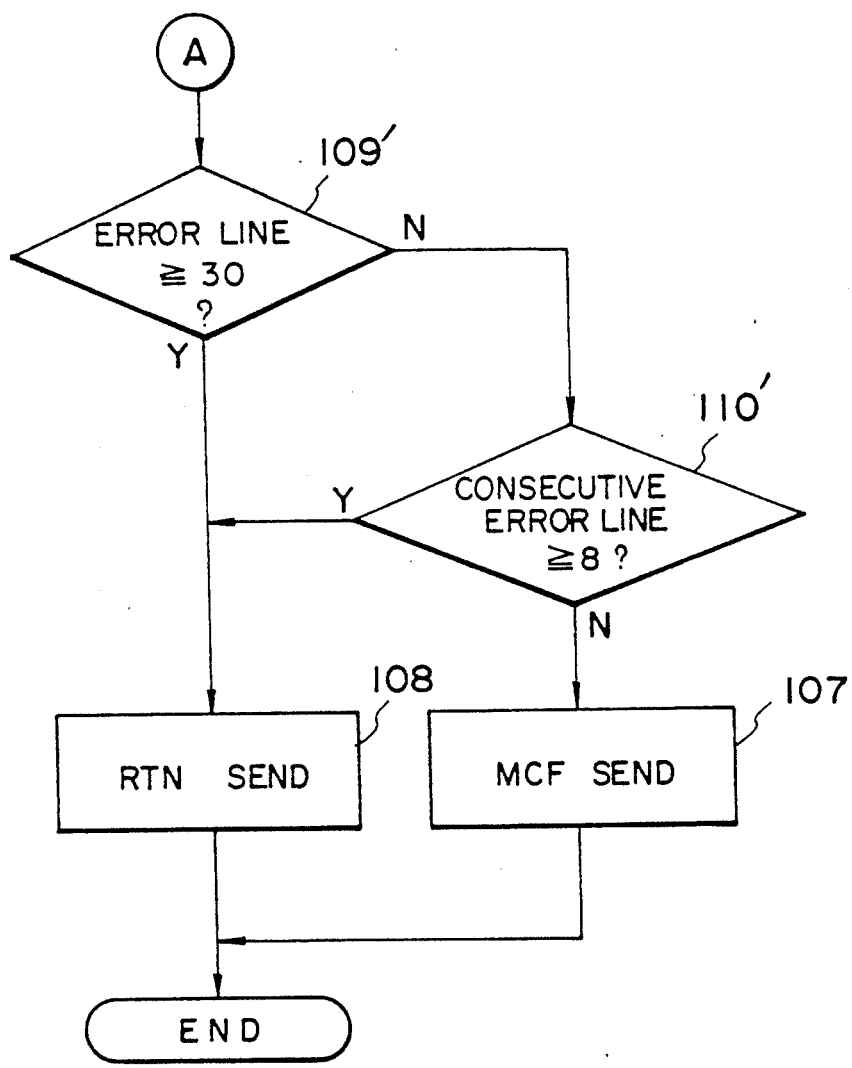

By monitoring the bits 122 and 123 of the NSS signal, it is possible to discriminate whether the facsimile transmission is sent via the wireless transmission path or via the path involving the acoustic coupler. In such a case where the use of wireless transmission path and the use of acoustic coupler is discriminated on the basis of the bit 122 and the bit 123 of the NSS signal, it is possible to change the threshold number of error lines as shown in FIGS. 8A and 8B in response to the wireless transmission path and the acoustic coupler. In these drawings, the steps already described with reference to FIG. 5 are given identical reference numerals and the description thereof will be omitted.

In the process of FIG. 8A, a modified step 105' is used to discriminate whether the facsimile transmission is made via the wired transmission path or wireless transmission path or via the transmission path involving acoustic coupler. When it is discriminated that the transmission is made via the wired transmission path or via the wireless transmission path, the steps 106-110 are performed as already described. When it is discriminated that the facsimile transmission is made via the transmission path involving the acoustic coupler, a step 109' is performed where the number of error lines has reached thirty or not. If YES, the step 108 is performed where the RTN signal is sent to the facsimile apparatus at the source terminal and the facsimile apparatus at the source terminal requests re-trial of facsimile transmission to the operator similarly to the foregoing case. When the result of discrimination is NO, it is further discriminated in a step 110' whether there are consecutive eight or more error lines or not. If YES, the step 108 is performed and the RTN signal is sent to the facsimile apparatus as the source terminal while if NO, the step 107 is performed and the MCF signal is sent to the source terminal for informing of the successful reception of that page.

By changing the threshold number of error lines in the steps 109 and 109' or in the steps 110 and 110', the difference in the transmission quality between the wireless transmission path and the transmission path involving the acoustic coupler can be taken into consideration with respect to the allowable quality of the facsimile transmission.

Next, a modification of the process of FIG. 5 or FIG. 8A will be described with reference to FIG. 9.

Figure 9:
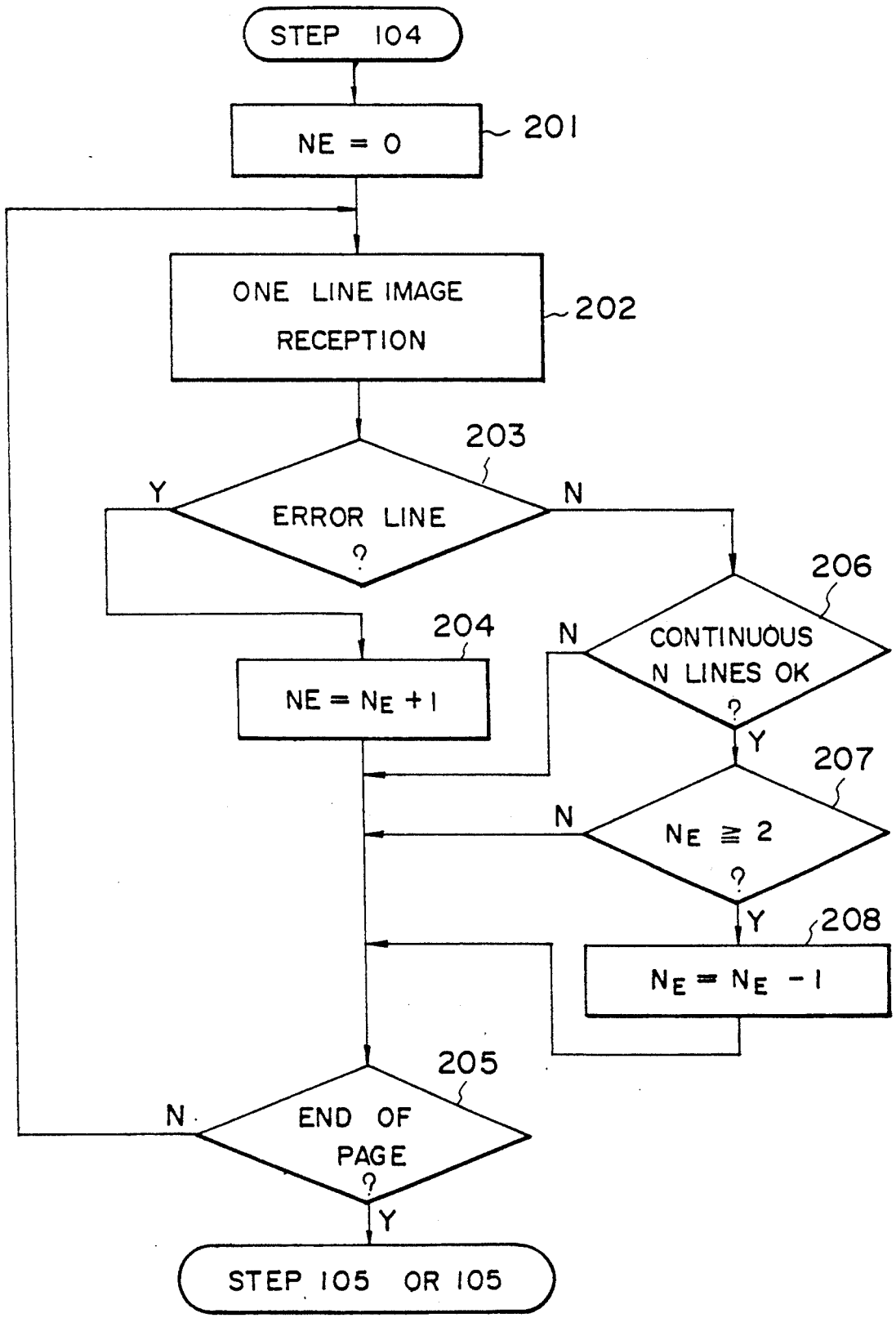
FIG. 9 is a flowchart showing a modified error detection process.

The process of FIG. 9 represents the content of the process performed in the step 104 and comprises a first step 201 where the total number of error lines $N_E$ in the page to be received is initialized, a second step 202 for receiving one line of transmitted image, a third step 203 for detecting the error in the received line, a fourth step 204 for counting up the total number of error lines, and a step 205 for discriminating if the received line is the end of that page. If the result of discrimination is the step 205 is NO, the step 202 and the steps following thereto are performed repeatedly until the last line is received.

When the result of discrimination in the step 203 is NO indicating that the just received line is a line successfully received, a discrimination is made in a step 206 whether a predetermined number of successive lines such as N successive lines has been received successfully and if YES, the number $N_E$ is reduced by one within the range that $N_E$ is a positive integer in steps 207 and 208. If the result of discrimination in the step 206 is NO, the step 205 is performed and further error detection for the subsequent line is continued.

By reducing the total number of errors upon successful reception of a number of consecutive lines, the facsimile transmission is rescued from being discarded, as such a facsimile transmission may still be intelligible even when the actual total number of lines has exceeded fifty because of the noises concentrated at the beginning of the facsimile transmission. Thus, the operator at the source terminal can save the additional trial of transmitting the document.

As a modification of the process of FIG. 5, one may omit either the step 109 for discriminating the transmission failure on the basis of the total number of error lines or the step 110 for discriminating the transmission failure on the basis of the consecutive appearance of the error lines. A same modification is applicable also for the case of the process of FIGS. 8A and 8B.

Further, the present invention is not limited to the embodiments described heretofore but various variations and modifications may be made without departing from the scope of the invention.

What is claimed is:

1. A facsimile apparatus for transmitting and receiving a facsimile transmission via a data transmission path including a first transmission medium at an end thereof to which the facsimile apparatus is connected, to and from another facsimile apparatus at the other end of the data transmission path, said data transmission path including at the other end thereof a second transmission medium selected from a plurality of transmission media each of different type and including a transmission medium identical to the first transmission medium, comprising:

modem means connected to the data transmission path for modulating an image data to be transmitted by the facsimile transmission via the data transmission path and for demodulating a received image data received by the facsimile transmission from said another facsimile apparatus via the transmission path;

communication control means coupled to the modem means for controlling the transmission and reception of the facsimile transmission to and from said another facsimile apparatus via the data transmission path;

reading means for reading an image to be transmitted and producing an image data to be transmitted by the facsimile transmission in correspondence to the image which has been read;

recording means for recording a visual image corresponding to an image data included in the received facsimile transmission; and system control means for controlling operations of said communication control means, said reading means and said recording means;

said system control means comprising first medium discriminating means for discriminating the type of the second transmission medium, error detection means for detecting a transmission error upon reception of the received image data on the basis of a predetermined error detection standard, error detection reference means for setting the predetermined error detection standard on the basis of which the error detection means performs the detection of the transmission error, said error detection reference means changing the predetermined error detection standard upon the type of the second transmission medium discriminated by the first medium discriminating means, error reporting means for controlling the communication control means such that an error signal indicative of a transmission error is transmitted to said another facsimile apparatus, and second medium discriminating means for controlling the communication control means such that the type of the first transmission medium is reported to said another facsimile apparatus.

2. A facsimile apparatus as claimed in claim 1 in which said first medium discriminating means discriminates the type of the second transmission medium based on a signal transmitted from said another facsimile apparatus together with the facsimile transmission.

3. A facsimile apparatus as claimed in claim 2 in which said signal it is transmitted together with a predetermined procedure signal of facsimile transmission transmitted from said another facsimile apparatus for informing of conditions on which the facsimile transmission will be made.

4. A facsimile apparatus as claimed in claim 3 in which said signal is transmitted as a part of the predetermined procedure signal.

5. A facsimile apparatus as claimed in claim 1 in which said second medium discriminating means controls the communication control means such that a signal is transmitted to said another facsimile apparatus informing of the type of the first transmission medium.

6. A facsimile apparatus as claimed in claim 1 in which said communication control means transmits the signal together with the facsimile transmission to said another facsimile apparatus.

7. A facsimile apparatus as claimed in claim 1 in which said communication control means transmits the signal together with a predetermined procedure signal of facsimile transmission for informing said another facsimile apparatus of a condition under which the facsimile transmission will be made.

8. A facsimile apparatus as claimed in claim 1 in which said communication control means transmits the signal as a part of the predetermined procedure signal.

9. A facsimile apparatus as claimed in claim 1 in which said error detection means counts up the number of lines that involved errors in one page of the image transmitted by the facsimile transmission and detects the transmission error when the number has reached a predetermined number of lines set by the error detection reference means as the predetermined error detection standard, and said error detection reference means sets the predetermined number of lines to a first value when it is discriminated by the first medium discrimination means that the second transmission medium is identical to the first transmission medium and to a second value different from the first value when it is discriminated by the first medium discrimination means that the second transmission medium is different from the first transmission medium.

10. A facsimile apparatus as claimed in claim 9 in which the first transmission medium provides a first transmission quality while the second transmission medium provides a second transmission quality lower than the first transmission quality, and the first value of the predetermined number of lines is set lower than the second value of the predetermined number of lines.

11. A facsimile apparatus as claimed in claim 10 in which error detection means further detects, when it is discriminated by the first medium discriminating means that the second transmission medium is not identical to the first transmission medium, the transmission error by monitoring the line involving errors appearing successively for a third value of the predetermined number of lines set lower than the second value of the predetermined number of lines.

12. A facsimile apparatus as claimed in claim 1 in which said first transmission medium is selected from the plurality of transmission media each of different type and said second medium discriminating means comprises a detector means for detecting the type of the transmission medium used as the first transmission medium 13. A facsimile apparatus as claimed in claim 12 in which said plurality of transmission media comprises an automobile telephone network.

14. A facsimile apparatus as claimed in claim 12 in which said plurality of transmission media comprises an acoustic coupler.

15. A facsimile apparatus for transmitting and receiving an image data via a transmission path including a transmission medium selected from a plurality of transmission media, comprising:

modem means connected to an end of the transmission path for modulating a transmitting image data to be transmitted via the transmission path and for demodulating a received image data transmitted via the transmission path;

communication control means coupled to the modem means for controlling the transmission and reception of the facsimile transmission to and from the data transmission path;

image reading means for reading a document image to be transmitted and for producing the transmitting image data corresponding to the document image that has been read;

image recording means for recording a visual image in accordance with the received image data on a recording sheet;

system control means for controlling operations of said communication control means, said reading means and said recording means;

said system control means including medium discrimination means for discriminating the transmission medium included in the transmission path, error detection means for counting up errors involved in the received image data and detecting a transmission error when a number of the counted errors has exceeded a predetermined threshold, error detection reference means for setting the predetermined threshold, said error detection reference means changing the predetermined threshold in response to the discrimination by the medium discrimination means, and means for informing of the transmission error to a terminal transmitting the facsimile transmission from another end of the transmission path.

* * * * *